Patented Sept. 8, 1942

2,295,406

UNITED STATES PATENT OFFICE 2,295,406

CARBOCYCLIC NITRILES AND METHODS FOR THEIR PRODUCTION

Samuel Edward Jolly, Prospect Park, Pa., assignor to Sun Oil Company, Philadelphia, Pa., a corporation of New Jersey No Drawing. Application February 12, 1941, Serial No. 378,682

4 Claims. (Cl. 260—464)

This invention is directed to a new class of carbocyclic nitriles, having commercially valuable properties, and to methods for their production.

The nitriles in accordance with this invention are those formed from a group of carbocyclic acids of the series $C_nH_{2n-x}O_2$ in which $x$ is an even number from 4 to 10, inclusive, and $n$ may vary from 13 to 30. The acids are monobasic, saturated, and are believed to contain one or more 5-membered rings. They probably contain no hydroxy or keto groups. The acids in the group have acid numbers varying from about 100 to about 230, molecular weights of from about 220 to about 440, and refractive indices ($n_D 20°$ C.) of from about 1.4900 to about 1.5135. More detailed information concerning these acids may be found in papers by Harkness et al. and by Goheen in "Industrial and Engineering Chemistry," volume 32, pp. 449–508.

The acids forming the group in question are obtainable from petroleum, and are present, as alkali salts, in the asphaltic still bottoms produced in the distillation of topped crude in the presence of caustic soda to produce lubricating oils (see Pew Patent 1,761,153 and Angstadt Patent 1,931,880). They may be obtained commercially from this source as a mixture of the various acids, in accordance with the method of the Terrell et al. Patent 2,056,913; the acids obtained being predominantly those in which $x$ (in the formula above) is 8 or 10. Acids of the same series comprising predominantly those in which $x$ is 4 or 6 may be obtained, as in Alleman Patent 1,694,461, from the alkali precipitate formed during the refining treatment of petroleum lubricating oil. The acids therefore comprise those either naturally occurring in petroleum or formed in petroleum during the process of refining.

The mixture of acids may be separated into more or less pure individual acids by fractional distillation in vacuo. The acids distill between about 125° C. and 330° C. at 2 mm. The mixture solidifies at about −50° C. It generally contains some hydrocarbons as impurities, reducing the acid number of the mixture, but the presence of these hydrocarbons does not prevent the use of the commercial mixture of acids in accordance with the present invention.

It has been found in accordance with the present invention that valuable industrial products may be obtained by treatment of the acids comprising this group, either in purified form or as the commercial mixture, with ammonia for the formation of their nitriles.

In general the reaction between the petroleum acids and ammonia is carried out at a temperature of from about 200° C. to about 400° C. preferably at supra-atmospheric pressure.

The following procedure is illustrative:

A mixture of petroleum acids (and not more than 50% petroleum hydrocarbons) is delivered to a reaction vessel made of glass, stainless steel, enameled lined metal or any other material that will not be attacked by the products to be reacted. Preferably the vessel is provided with a long narrow neck or cylinder in order to provide for expansion and particularly to afford a longer period of contact between the gas and the liquid.

After the reaction vessel is loaded with the above mixture, it is heated until a temperature of from 200° C. to 400° C. (preferably about 350° C.) is attained. Ammonia is introduced at the bottom of the reaction chamber, preferably in a finely divided state, as, for example, through a tube provided with a diffusion plate; or a rotating stirrer, such as a "turbo mixer," may be used.

At the top of the neck or cylinder provision is made for condensing and collecting any water that is split off, as well as any other material which is volatile or is carried over by entrainment. A convenient arrangement includes a condenser provided with a water jacket. The water is separated and the organic material returned to the reaction chamber.

The reaction may be carried on at atmospheric pressure, but if the boiling point of the starting material is below the desired reaction temperature, a higher pressure is desirable. A pressure of about 75 lbs. per square inch is sufficient in most cases. The reaction may be carried out in the presence of dehydrating catalysts such as silica gel, alumina, thorium oxide, or like substances.

The reactions which take place between the petroleum acids and ammonia in forming nitriles involve three stages: first, the formation of the ammonium salt of the petroleum acids; second, splitting off water from this ammonium salt and forming the amide; and third, splitting off water from the amide to form the nitrile. These stages may be represented as follows:

(1) 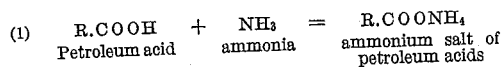
R.COOH + NH₃ = R.COONH₄
Petroleum acid   ammonia   ammonium salt of petroleum acids (2) 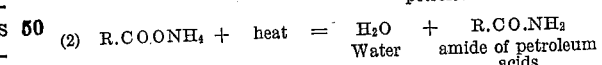
R.COONH₄ + heat = H₂O + R.CO.NH₂
                   Water    amide of petroleum acids (3) 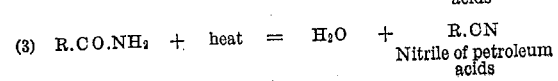
R.CO.NH₂ + heat = H₂O + R.CN
                   Nitrile of petroleum acids When water is no longer split off the reaction is complete.

Instead of utilizing as a starting material a mixture of petroleum acids and petroleum hydrocarbons, oil-free petroleum acids may be used. These may be separated from a mixture of hydrocarbons and acids by any desired method, such as by known methods of extraction with solvents. Or the hydrocarbons may be separated from the original mixture of hydrocarbons and alkali metal soaps, as by known solvent extraction, and the soaps then acidified. Purified petroleum acids having a saponification number of about 182.5 are produced by known methods and these may be used as the starting material. Other petroleum acids having lower saponification numbers and containing varying percentages of hydrocarbons are also produced by known methods and these also may be used as starting materials. For example, petroleum acids are known that have a saponification number of 130 and contain about 40% of hydrocarbons. Any starting mixture of petroleum acids containing hydrocarbons should not contain over 50% of hydrocarbons.

If purified petroleum acids are used as a starting material the ammonia treatment above described is applied and the same reactions occur. The resultant product is the same except that with one starting material relatively pure nitriles are formed and with the other starting material a mixture of nitriles and petroleum hydrocarbons is obtained.

The nitriles produced may be purified, if required, by fractional distillation in vacuo. They have a five-membered ring system and the generic formula $C_{n-1}H_{2n-x-1}CN$, where $x$ and $n$ have the same values given above for the acids. The nitriles have molecular weights varying within the group from about 300 to about 420; a boiling range of from about 90° C. to about 300° C. at 3 mm.; and refractive indices varying from about 1.4803 to about 1.4980, $n_D$ 20° C. The specific gravity of a nitrile is considerably lower than that of the corresponding acid. For example, the specific gravity of nitrile prepared from a purified acid having a specific gravity of $0.990^{20°C.}$ is $0.947^{20°C.}$ The nitriles prepared according to this invention may be reduced to amines by known methods. The nitriles are useful as plasticizers and as modifiers of alkyd resins. They are valuable intermediates for the production of materials which may be added to lubricating oils to increase the efficiency of the latter. In particular their halogenated derivatives, which are the subject matter of my copending application Serial No. 357,661, filed September 20, 1940, are valuable extreme pressure agents.

What I claim and desire to protect by Letters Patent is:

1. The nitrile of an aliphatic, saturated carbocyclic petroleum acid having the generic formula $C_nH_{2n-x}O_2$, where $n$ is a number from 13 to 30, inclusive, and $x$ is an even number from 4 to 10, inclusive.

2. An aliphatic, saturated carbocyclic nitrile having the generic formula $C_{n-1}H_{2n-x-1}CN$, where $n$ is a number from 13 to 30, inclusive, and $x$ is an even number from 4 to 10, inclusive.

3. The method of forming the nitrile of claim 2 which comprises heating at reaction temperature ammonia and a saturated carbocyclic petroleum acid having the generic formula $C_nH_{2n-x}O_2$, where $n$ is a number from 13 to 30, inclusive, and $x$ is an even number from 4 to 10, inclusive.

4. The mixed nitriles formed from a mixture of saturated carbocyclic petroleum acids having the generic formula $C_nH_{2n-x}O_2$, where $n$ is a number from 13 to 30, inclusive, and $x$ is an even number from 4 to 10, inclusive; said mixture of acids being recovered from the asphaltic still residue obtained in the distillation of topped crude petroleum over caustic.

SAMUEL EDWARD JOLLY.